# 3,056,806
EPOXYALKYL ACYL PHOSPHATES

Benjamin Phillips and Paul S. Starcher, Charleston, W. Va., assignors to Union Carbide Corporation, a corporation of New York
No Drawing. Continuation of application Ser. No. 645,007, Mar. 11, 1957. This application Feb. 3, 1960, Ser. No. 6,364
8 Claims. (Cl. 260—348)

The present invention relates to novel organic epoxide-containing esters of phosphoric acid. More particularly, this invention is directed to epoxyalkyl esters of phosphoric acid which are particularly adapted for use as plasticizers and stabilizers for vinyl-type resin compositions imparting thereto increased heat and light stability and improved fire resistant properties.

This application is a continuation of application Serial No. 645,007, filed March 11, 1957, now abandoned, which is a continuation-in-part of application Serial No. 303,-152, filed August 7, 1952, now United State Patent No. 2,785,185, issued March 12, 1957.

The compounds of this invention can be conveniently characterized by reference to the following general formula:

wherein the substituent R represents aliphatic or aromatic radicals and wherein at least one of the substituent R's represents an epoxyalkyl radical or an epoxyalkyl-substituted aromatic radical. A preferred subclass of the compounds of this invention are those characterized by the general formula above wherein the substituent R represents an aliphatic hydrocarbon radical, preferably an alkyl radical, or a mononuclear aromatic hydrocarbon radical, preferably a phenyl radical and at least one of the substituent R's represents an epoxyalkyl group or an epoxy-substituted mononuclear aromatic radical. A particularly preferred novel subclass of the compounds of the invention is that characterized by the following general formula:

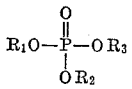

wherein $R_1$ represents a member selected from the group consisting of epoxyalkyl radicals and epoxyalkyl-substituted phenyl radicals and $R_2$ and $R_3$ represent members selected from the group consisting of alkyl, epoxyalkyl and epoxyalkyl substituted phenyl radicals.

A more particularly preferred novel subclass of the compounds of the invention is that characterized by the general formula:

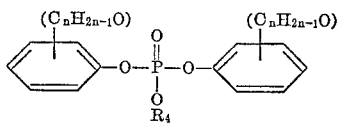

wherein $R_4$ represents an alkyl radical containing from 1 to 12 carbon atoms and the group $(C_nH_{2n-1}O)$ represents an epoxyalkyl group composed of carbon, hydrogen and one oxygen atom attached to vicinal carbon atoms and containing $n$ carbon atoms, $2n-1$ hydrogen atoms wherein $n$ represents a whole positive integer in the range from 3 through 18.

The process for preparing the compounds of this invention is effected by reacting an alkenyl phosphate with peracetic acid or acetaldehyde monoperacetate at a temperature in the range of from 0° C. to 100° C. at atmospheric pressure. The alkenyl-phosphates are preferably reacted with organic solvent solutions of peracetic acid or acetaldehyde monoperacetate. Typical solvent solutions of acetaldehyde monoperacetate or peracetic acid can be those manufactured in accordance with the processes disclosed in applications, Serial No. 303,152, filed August 7, 1952, now U. S. Patent No. 2,785,185, and Serial No. 374,142, filed August 13, 1953, now abandoned.

In carrying out the process of this invention for preparing the epoxyalkyl phosphates employing acetaldehyde monoperacetate as the epoxidant, a typical alkenyl phosphate such as, for example, allyl diphenyl phosphate is dissolved in ethylbenzene in a reaction vessel equipped with a column and a still head. The mixture is heated and the temperature maintained in the range of from 0° C. to 100° C. and preferably at about 70° C. Thereupon, acetaldehyde monoperacetate, usually in the form of a solution in acetone, is fed to the mixture of the phosphate in ethylbenzene at a uniform rate. Acetaldehyde, acetone and acetic acid are removed continuously at the still head. After removal of the low-boiling product, the product 2,3-epoxypropyl diphenyl phosphate can be accepted as a residue or refined by further treatment such as by distillation.

When peracetic acid is employed as the epoxidizing agent, a typical alkenyl phosphate such as dioleyl 2-ethylhexyl phosphate is charged to a reaction vessel equipped with a condenser and a dropping funnel. A solution of peracetic acid in a suitable solvent is then added dropwise to the phosphate while the temperature is maintained in a range of from 0° C. to 100° C. and preferably at about 40° C. to 80° C. After the addition of the peracetic acid solution is complete, the reaction is continued for an additional period of time until an analysis for peracetic acid indicates that substantially the theoretical amount of peracetic acid has been consumed. Thereupon, the reaction mixture is removed from the reaction vessel and fed dropwise to a still kettle containing ethylbenzene as a pot-boiler under reflux and the low-boiling products removed. The di-(9,10-epoxy-stearyl) 2-ethylhexyl phosphate can then be accepted as a residue product if desired. The epoxyalkyl phosphate can then be employed directly or subjected to further refinement by conventional means.

In the procedures described above epoxyalkyl phosphates are readily prepared and include epoxyalkyl phosphates such as:

ALKENYL PHOSPHATES triallyl phosphate
trimethallyl phosphate
tricrotyl phosphate
tri-(2-ethyl-2-hexenyl) phosphate
diallyl 2-ethylhexyl phosphate
di-(2-butenyl) 2-ethylhexyl phosphate
tri-(crotylphenyl) phosphate
allyl diphenyl phosphate
dioctyl 3-pentenyl phosphate
dimethallyl 2-ethylhexyl phosphate
di-(2-ethyl-2-hexenyl) 2-ethylhexyl phosphate
allyl di-(2-ethylhexyl) phosphate
methallyl di-(2-ethylhexyl) phosphate
crotyl di-(2-ethylhexyl) phosphate
2-hexenyl di-(2-ethylhexyl) phosphate
oleyl di-(2-ethylhexyl) phosphate
trioleyl phosphate
dioleyl 2-ethylhexyl phosphate

EPOXYALKYL PHOSPHATES tri-(2,3-epoxypropyl) phosphate
tri-(2,3-epoxy-2-methylpropyl) phosphate
tri-(2,3-epoxybutyl) phosphate
tri-(2-ethyl-2,3-epoxyhexyl) phosphate
di-(2,3-epoxypropyl) 2-ethylhexyl phosphate
di-(2,3-epoxybutyl) phosphate-2-ethylhexyl tri-(2,3-epoxybutylphenyl) phosphate
2,3-epoxypropyl diphenyl phosphate
dioctyl 3,4-epoxypentyl phosphate
di(2,3-epoxy-2-methylpropyl) 2-ethylhexyl phosphate
di(2-ethyl-2,3-epoxyhexyl) 2-ethylhexyl phosphate
2,3-epoxypropyl di-(2-ethylhexyl) phosphate
2,3-epoxy-2-methylpropyl di-(2-ethylhexyl) phosphate
2,3-epoxybutyl di-(2-ethylhexyl) phosphate
2,3-epoxyhexyl di-(2ethylhexyl) phosphate
9,10-epoxystearyl di-(2-ethylhexyl) phosphate
tri-(9,10-epoxystearyl) phosphate
di-(9,10-epoxystearyl) 2-ethylhexyl phosphate

ALKENYL PHOSPHATES di-(ortho-crotylphenyl) 2-ethylhexyl phosphate
di-(para-crotylphenyl) 2-ethylhexyl phosphate
di-(para-allylphenyl) 2-ethylhexyl phosphate
di-(ortho-allylphenyl) 2-ethylhexyl phosphate
di-(ortho-methallylphenyl) 2-ethylhexyl phosphate
di-(para-methallylphenyl) 2-ethylhexyl phosphate
di-(ortho-propenylphenyl) 2-ethylhexyl phosphate
di-(para-propenylphenyl) 2-ethylhexyl phosphate
di-(2-allyl-4-methylphenyl) 2-ethylhexyl phosphate
di-(2-allyl-5-methylphenyl) 2-ethylhexyl phosphate
di-(2-allyl-3-methylphenyl) 2-ethylhexyl phosphate
di-(2-allyl-6-methylphenyl) 2-ethylhexyl phosphate
di-(6-allyl-2,4-dimethylphenyl) 2-ethylhexyl phosphate
di-(2-allyl-3,5-dimethylphenyl) 2-ethylhexyl phosphate

EPOXYALKYL PHOSPHATES di-(ortho-2,3-epoxybutylphenyl) 2-ethylhexyl phosphate
di-(para-2,3-epoxybutylphenyl) 2-ethylhexyl phosphate
di-(para-2,3-epoxypropylphenyl) 2-ethylhexyl phosphate
di-(ortho-2,3-epoxypropylphenyl) 2-ethylhexyl phosphate
di-(ortho-2,3-epoxy-2-methylpropylphenyl) 2-ethylhexyl phosphate
di-(para-2,3-epoxy-2-methylpropylphenyl) 2-ethylhexyl phosphate
di(ortho-1,2-epoxypropylphenyl) 2-ethylhexyl phosphate
di-(para-1,2-epoxypropylphenyl) 2-ethylhexyl phosphate
di-(2-[2',3'-epoxypropyl]-4-methylphenyl) 2-ethylhexyl phosphate
di-(2-[2',3'-epoxypropyl]-5-methylphenyl) 2-ethylhexyl phosphate
di-(2-[2',3'-epoxypropyl]-3-methylphenyl) 2-ethylhexyl phosphate
di-(2-[2',3'-epoxypropyl]-6-methylphenyl) 2-ethylhexyl phosphate
di-(6-[2',3'-epoxypropyl]-2,4-di-methylphenyl) 2-ethylhexyl phosphate
di-(2-[2',3'-epoxypropyl]-3,4-di-methylphenyl) 2-ethylhexyl phosphate

ALKENYL PHOSPHATES di-(6-allyl-2,3,5-trimethylphenyl) 2-ethylhexyl phosphate
di-(6-methallyl-4-chlorophenyl) 2-ethylhexyl phosphate
di-(6-methallyl-2-methylphenyl) 2-ethylhexyl phosphate
di-(6-methallyl-3-methylphenyl) 2-ethylhexyl phosphate
di-(6-methallyl-4-methylphenyl) 2-ethylhexyl phosphate
di-(6-methallyl-2,4-dimethylphenyl) 2-ethylhexyl phosphate
di-(6-methallyl-2,5-dimethylphenyl) 2-ethylhexyl phosphate
di-(6-methallyl-3,4-dimethylphenyl) 2-ethylhexyl phosphate
di-(4-allyl-2,6-dichlorophenyl) 2-ethylhexyl phosphate
di-(4-allyl-2,6-dibromophenyl) 2-ethylhexyl phosphate
di-(4-allyl-2-bromo-6-methylphenyl) 2-ethylhexyl phosphate

EPOXYALKYL PHOSPHATES di-(6-[2',3'-epoxypropyl]-2,3,5-trimethylphenyl) 2-ethylhexylphosphate
di-(6-[2',3'-epoxy-2'-methylpropyl]-4-chlorophenyl) 2-ethylhexyl phosphate
di-(6-[2',3'-epoxy-2'-methylpropyl]-2-methylphenyl) 2-ethylhexyl phosphate
di-(6-[2',3'-epoxy-2'-methylpropyl] - 3 - methylphenyl) 2-ethylhexyl phosphate
di-(6-[2',3'-epoxy-2'-methylpropyl] - 4 - methylphenyl) 2-ethylhexyl phosphate
di-(6-[2',3'-epoxy-2'-methylpropyl]-2,4 - dimethylphenyl) 2-ethylhexyl phosphate
di-(6-[2',3'-epoxy-2'-methylpropyl]-2,5 - dimethylphenyl) 2-ethylhexyl phosphate
di-(6-[2',3'-epoxy-2'-methylpropyl]-3,4-dimethylphenyl) 2-ethylhexyl phosphate
di-(4-[2',3'-epoxypropyl]-2,6 - dichlorophenyl) 2-ethylhexyl phosphate
di-(4-[2',3'-epoxypropyl]-2,6-dibromophenyl) 2-ethylhexyl phosphate
di(4-[2',3'-epoxypropyl]-2-bromo-6-methylphenyl) 2-ethylhexyl phosphate

ALKENYL PHOSPHATES di-(4-allyl-2,6-dimethylphenyl)-2-ethylhexyl phosphate
di-(4-crotyl-2,6-dichlorophenyl)-2-ethylhexyl phosphate

EPOXYALKYL PHOSPHATES di-(4-[2',3'-epoxypropyl]-2,6-dimethylphenyl) 2 - ethylhexyl phosphate
di-(4-[2',3'-epoxybutyl]-2,6-dichlorophenyl) 2-ethylhexyl phosphate The analysis for the epoxy group content of an epoxide sample is based upon its reaction with pyridine hydrochloride to form pyridine and the corresponding chlorhydrin of the epoxide. This analysis can be performed, for example, by introducing into a pressure bottle, containing 25 milliliters of 1 N pyridine hydrochloride in chloroform, an amount of epoxide sample calculated to react with about 50 percent of the pyridine hydrochloride. The bottle is then sealed and the contents heated in a steam bath for a period of about one hour. At the end of this time, the bottle and contents are cooled, ten drops of phenolphthalein indicator (1.0 gram per 100 milliliters of 60 percent ethanol) added, and the mixture titrated to a permanent red endpoint with a standard 0.2 N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the epoxy group content can be determined.

The analyses for determining epoxidant, that is, peracetic acid or acetaldehyde monoperacetate, content can be performed, for example, by introducing one to 1.5 grams of a sample of unknown epoxidant concentration into a flask contaning a mixture of 60 milliliters of 50 weight percent aqueous sulfuric acid solution and five milliliters of a saturated potassium iodide solution. The flask is swirled to mix the solutions and then titrated immediately with a 0.1 N aqueous sodium thiosulfate solution to a colorless endpoint. From the titration data thus obtained, a determination of epoxidant content can be made.

In order to determine the acetic acid content of the reaction mixtures, the following procedure can be used, for example, another sample of approximately the same size can be taken at the same time and introduced into a flask containing about 100 milliliters of water and about 15 milliliters of acetaldehyde. The flask and contents are allowed to stand for ten to fifteen minutes after mixing so as to permit whatever peracetic acid and or acetaldehyde monoperacetate is present in the sample to be converted to acetic acid. The acetic acid of the solution is then titrated with a 0.5 N sodium hydroxide solution using a phenolphthalein indicator. The amount of acetic acid originally present in the sample then can be taken to be equal to the final acetic acid content after conversion, as determined by titration with sodium hydroxide, minus the amount of acetic acid formed by the reaction of peracetic acid with acetaldehyde, or the decomposition of acetaldehyde monoperacetate, orignally present in the sample. The amount of acetic acid formed by reaction of peracetic acid with acetaldehyde, or from the decomposition of acetaldehyde monoperacetate may be calculated from the previous sodium thiosulfate titration determination of epoxidizing agent content on the basis of two moles of acetic acid being formed from each mole of peracetic acid or acetaldehyde monoperacetate.

The following examples are illustrative of the practice of the invention:

EXAMPLE 1

*Preparation of Bis(p-(2,3-Epoxybutyl) Phenyl) 2-Ethylhexyl Phosphate*

A 21.6 percent peracetic acid solution in ethyl acetate (total solution weight equals 508 grams) was added dropwise to 272 grams of bis(p-crotylphenyl) 2-ethylhexyl phosphate over a period of 2.5 hours at room temperature. After standing for 13 hours at room temperature, the reaction mixture was fed dropwise to a still kettle containing ethylbenzene under reflux at reduced pressure such that the temperature was 60° C. The ethyl acetate, acetic acid, and ethylbenzene were removed at the still head. The kettle residue was stripped on a falling film stripper at 100° C. and 0.2 mm. to yield 280 grams of a viscous liquid product which analyzed 72 percent by the pyridine-hydrochloride method as bis(p-(2,3-epoxybutyl)-phenyl) 2-ethylhexyl phosphate.

The epoxides described above can be readily made by employing the procedure of Example 1.

What is claimed is:

1. Epoxyalkyl-containing phosphates of the formula:

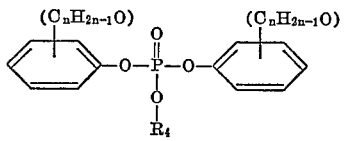

wherein $R_4$ is selected from the group consisting of alkyl of 1 to 12 carbon atoms and the group

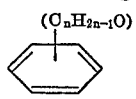

the group $(C_nH_{2n-1}O)$ represents an epoxyalkyl group composed of carbon, hydrogen and one oxygen atom attached to vicinal carbon atoms and containing $n$ carbon atoms, $2n-1$ hydrogen atoms wherein $n$ represents a whole positive integer in the range of from 3 through 18.

2. Epoxyalkyl-containing phosphates of the formula:

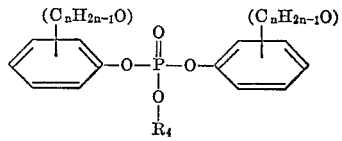

wherein $R_4$ represents alkyl of 1 to 12 carbon atoms and the group $(C_nH_{2n-1}O)$ represents an epoxyalkyl group composed of carbon, hydrogen and one oxygen atom attached to vicinal carbon atoms and containing $n$ carbon atoms, $2n-1$ hydrogen atoms wherein $n$ represents a whole positive integer in the range of from 3 through 18.

3. Epoxyalkyl-containing phosphates of the formula:

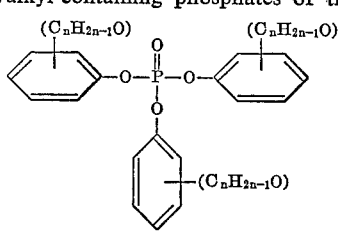

wherein $(C_nH_{2n-1}O)$ represents an epoxyalkyl group composed of carbon, hydrogen and one oxygen atom attached to vicinal carbon atoms and containing $n$ carbon atoms, $2n-1$ hydrogen atoms wherein $n$ represents a whole positive integer in the range of from 3 through 18.

4. Di-para[2,3-epoxybutylphenyl]-2-ethylhexyl phosphate.

5. Di - (2 - [2',3' - epoxypropyl]3,4 - dimethylphenyl) 2-ethylhexyl phosphate.

6. Di-(4-[2',3'-epoxypropyl]2,6-dichlorophenyl) 2-ethylhexyl phosphate.

7. Di-(4-[2',3'-epoxypropyl]2,6-dimethylphenyl) 2-ethylhexyl phosphate.

8. Di-(4-[2',3'-epoxybutyl]2,6-dichlorophenyl) 2-ethylhexyl phosphate.

References Cited in the file of this patent
UNITED STATES PATENTS

| | | |
|---|---|---|
| 2,785,185 | Phillips et al. | Mar. 12, 1957 |
| 2,826,592 | Mueller et al. | Mar. 11, 1958 |